United States Patent [19]
Bouton

[11] Patent Number: 5,245,320
[45] Date of Patent: Sep. 14, 1993

[54] MULTIPORT GAME CARD WITH CONFIGURABLE ADDRESS

[75] Inventor: Frank M. Bouton, Beaverton, Oreg.

[73] Assignee: Thrustmaster, Inc., Tigard, Oreg.

[21] Appl. No.: 932,501

[22] Filed: Aug. 19, 1992

Related U.S. Application Data

[63] Continuation-in-part of Ser. No. 911,765, Jul. 9, 1992.

[51] Int. Cl.⁵ .............................................. G09G 3/02
[52] U.S. Cl. .................................. 345/167; 273/148 B
[58] Field of Search ............... 340/706, 709, 710, 711, 340/712; 273/148 B, 434, 438, DIG. 28, 85 G; 434/45; 200/5 R, 6 A; 74/471 XY; 341/20

[56] References Cited

U.S. PATENT DOCUMENTS

| | | | |
|---|---|---|---|
| 4,501,424 | 2/1985 | Stone et al. | 273/148 |
| 4,516,777 | 5/1985 | Nikora | 273/148 B |
| 4,588,187 | 5/1986 | Dell | 273/1 |
| 4,659,313 | 4/1987 | Kuster et al. | 273/438 |
| 4,852,031 | 7/1989 | Brasington . | |
| 4,868,780 | 9/1989 | Stern | 364/900 |
| 4,924,216 | 5/1990 | Leung | 340/709 |
| 5,134,395 | 7/1992 | Stern | 341/20 |

FOREIGN PATENT DOCUMENTS 1487915  6/1989  U.S.S.R. .............................. 273/434

OTHER PUBLICATIONS

Lewis C. Eggebrecht, *Interfacing to the IBM Personal Computer,* 1987, pp. 129, 197-199.

Primary Examiner—Ulysses Weldon
Assistant Examiner—Matthew Luu
Attorney, Agent, or Firm—Marger, Johnson, McCollom & Stolowitz

[57] ABSTRACT

The invention is a multi-port video game controller interface which provides supports for at least two multi-functional game controllers via a single microcomputer I/O bus connector. An address decoder selectively enables one of the game controllers, in order to access the control input received therefrom. A program operating in the personal computer polls separate addresses within the game controller address space to receive input information from the different controllers. Jumper blocks map each of the plurality of controllers to separate and distinct addresses, in order to avoid address conflicts and provide flexibility.

19 Claims, 6 Drawing Sheets

MULTIPORT GAME CARD WITH CONFIGURABLE ADDRESS

RELATED APPLICATION DATA

This is a continuation in part of my copending application Ser. No. 07/911,765 filed Jul. 9, 1992.

BACKGROUND OF THE INVENTION

This invention relates generally to controllers for video games and simulators implemented on a computer and more particularly to interfacing multiple multifunctional controllers to a personal computer.

Conventionally, a personal computer is enabled to be controlled by external manual control devices by means of a game card, which provides an external game port into which control devices, such as a joystick, can be plugged. To provide widespread compatibility, which is essential to the ability to mass market a wide variety of video games and simulation programs, industry standards have been developed for game cards for personal computers such as those commonly referred to as IBM-compatibles. The universal adoption of these standards means that any external manual input device designed to control such computers and software must be compatible with the industry-standard game port. Any input device lacking such compatibility will not be able to be used with conventional personal computers equipped with standard game boards and will not be widely accepted.

The problem is that the industry standard game port provides only a limited number of inputs: four discrete signal inputs for receiving binary signals signifying "On" and "Off" and four analog signal inputs for receiving variable voltage signals, such as output by a potentiometer, which are continuously variable over a limited range. The number of game boards that can be plugged into a conventional PC is also limited, to one. Consequently, the number of controllers supported by a standard game port, and the number of allowable functions communicated thereby, is severely restricted.

Figure 1:
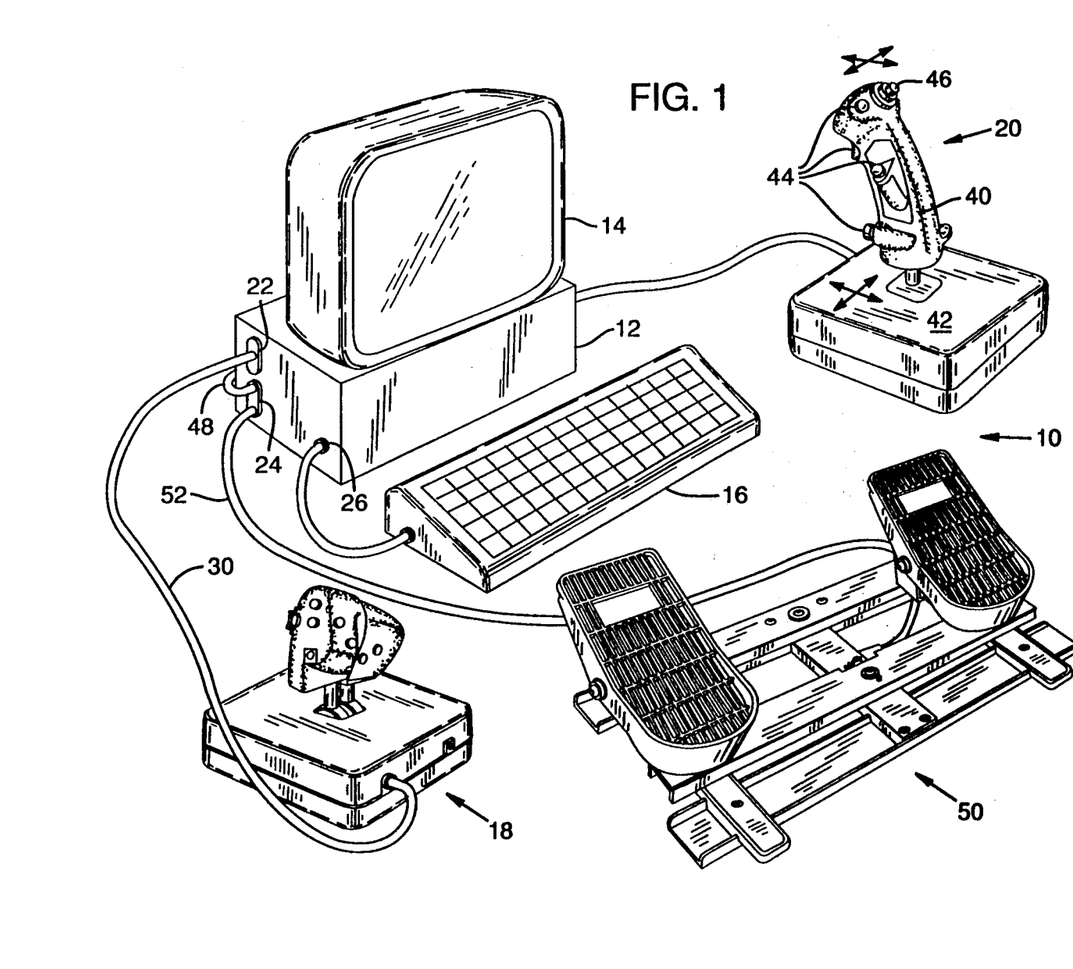
FIG. 1 is a perspective view of a personal computer and keyboard with two multifunctional game controllers connected according to the invention.

For example, a PC configured as a combat aviation video game/simulator as shown in FIG. 1 has a joystick controller and a foot-pedal rudder controller. The joystick conventionally has a handle pivotally coupled to a base for forward/rearward movement and left/right movement by the user. The handle is connected in the base to transducers such as potentiometers coupled to two of the analog inputs of the game port to input proportional signals to the PC microprocessor to control analog functions in the video game/simulation program. The handle also includes four discrete switches that are operable by the user's fingers to control discrete functions in the video game/simulation program. The joy-stick controller therefore consumes two of the analog inputs and all four of the discrete inputs. The foot-pedal rudder controller potentiometer can be supported on one of the remaining analog inputs by providing a "Y-connector" as shown in FIG. 1, which is known in the art. With this arrangement there are no discrete inputs left in the conventional game port to support the discrete switches of a throttle controller and only a single analog input.

Attempting to circumvent these limitations, video game and simulator programmers have implemented many commands by programming function keys on the PC keyboard. This approach detracts from the realism of simulation, which is particularly important to flight simulation video games. Developers have strived to attain more realism by designing microprocessor-based input devices which output keycodes to the PC keyboard port emulating function keys on the PC keyboard. One example is disclosed in U.S. Pat. No. 4,852,031 to Brasington. Thrustmaster, Inc. has also marketed a single throttle controller that outputs keycodes to the PC keyboard port. These efforts have been successful to some extent but have also encountered limits on the number of controllers that can be used simultaneously.

In addition to the technical limitations of the keyboard emulation technique, the cost and complexity of the electronics required to accomplish the keyboard port emulation can also be prohibitively expensive. Because of the ubiquitous use of the controlled functions in complex video games the emulation hardware must be able to translate the controller inputs into one of many unique key commands required by the specific video simulation software. In order to accomplish the emulation, as well as provide the normal keyboard functionality, the hardware typically requires a microprocessor and its associated components, e.g., RAM and ROM.

Other approaches to supporting additional inputs and/or controllers are disclosed in the following U.S. Pat. Nos. 4,588,187 to Dell; 4,924,216 to Lemg; 4,868,780 to Stern; 5,234,395 to Stern; and 4,501,424 to Stone et al. These are generally more complicated and expensive than is desirable.

Accordingly, a need remains for a better way to interface a plurality of multi-functional game controllers to a video game or simulation program running on a conventional PC via a game card without having to emulate keyboard commands in hardware.

SUMMARY OF THE INVENTION

It is, therefore, an object of the invention to improve the ability of personal computers to be controlled by multifunctional controllers at lower cost.

Another object is to provide a video game controller interface which can support at least two separate game controllers without the use of the keyboard port.

A further object of the invention is to eliminate the need for a keyboard or for keyboard emulation hardware that has, up to this point, been required to support more that one multifunctional game controller.

The invention is an improvement in a video game controller interface which provides supports for a plurality of game controllers via a game port. The invention maps input data from each of the plurality of game controllers to unique addresses within the memory space of the personal computer. A program operating on the computer selectively polls each of the available address locations at which data from the individual controllers can reside, to access the input signals from each of the controllers and apply the inputs to the appropriate video game software functions. The program includes a method of polling the individual game controllers to test for their existence and, if detected, to receive individual input signals therefrom.

This invention enables the range of devices that can be supported from a single video game port to be substantially increased without making any change to the base computer hardware. The use of an inexpensive multiported game card, according to the present invention, and a mere software change in the computer is all that is needed to make use of the additional game controllers. This invention enables much more sophisticated video games to be played successfully on a standard PC but is not limited to game-playing. It can be used in other applications of personal computers that make use of a game port or similarly limited input port, such as in data logging systems.

The foregoing and other objects, features and advantages of the invention will become more readily apparent from the following detailed description of a preferred embodiment of the invention which proceeds with reference to the accompanying drawings.

DETAILED DESCRIPTION

FIG. 1 shows a video game/simulation system 10 for simulating operation of a complex system having a plurality of user-controlled functions such as a combat aviation video game program. The system includes a conventional personal computer 12 having a microprocessor operable under control of a video game/-simulation program stored in memory, a conventional display 14 for displaying images produced by operation of the program in the microprocessor, and optionally a conventional keyboard 16.

Preferably, for running aviation video games and simulation programs, both a split-throttle controller 18 and a joystick controller 20 are connected to the computer, as well as a foot-pedal rudder controller 50. In prior art video game systems, which have only a single game port, one or more of the game controllers are connected to the keyboard port 26. However, according to the invention, the split-throttle controller 18 is shown connected to a first game port 22 of a game card 60 (FIG. 2) residing in the housing of computer 12, and the joystick controller 20 and foot-pedal rudder controller 50 are connected via a "Y-connector" to a second game port 24 located on the same game card. Only the keyboard 16 is connected to the keyboard port 26.

As previously mentioned, the joystick controller 20 and foot-pedal rudder controller 50 consume all four discrete inputs and three of the four analog inputs of a conventional game port. A directional controller, or "joy hat" 46, is also implemented using discrete switches to provide center, forward, backward, left and right control positions. The discrete switches are combined into a single analog input using a resistor ladder network as described in my copending application VIDEO GAME/FLIGHT SIMULATOR CONTROLLER WITH SINGLE ANALOG INPUT TO MULTIPLE DISCRETE INPUTS, Ser. No. 07/911,765 filed Jul. 9, 1992, incorporated herein by reference.

Figure 4A:
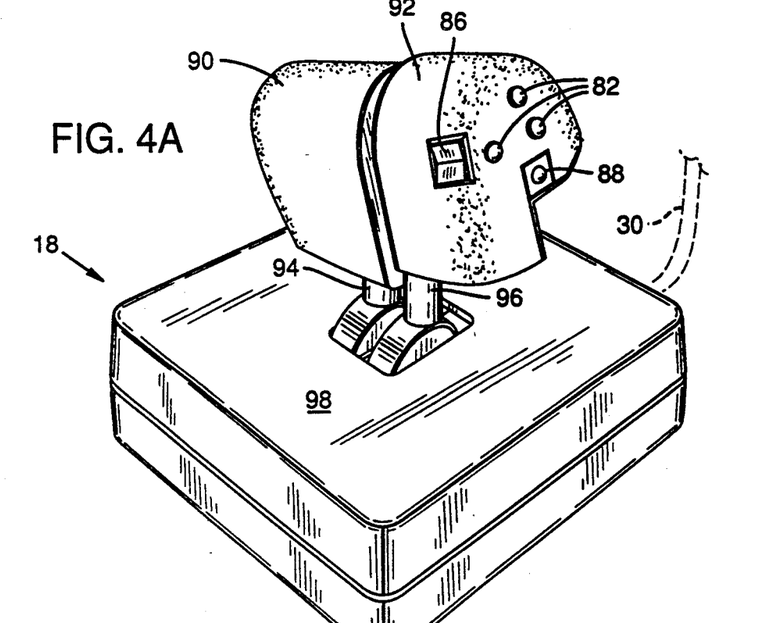
FIG. 4A is a perspective view of the back side of the split throttle controller of FIG. 1.
Figure 4B:
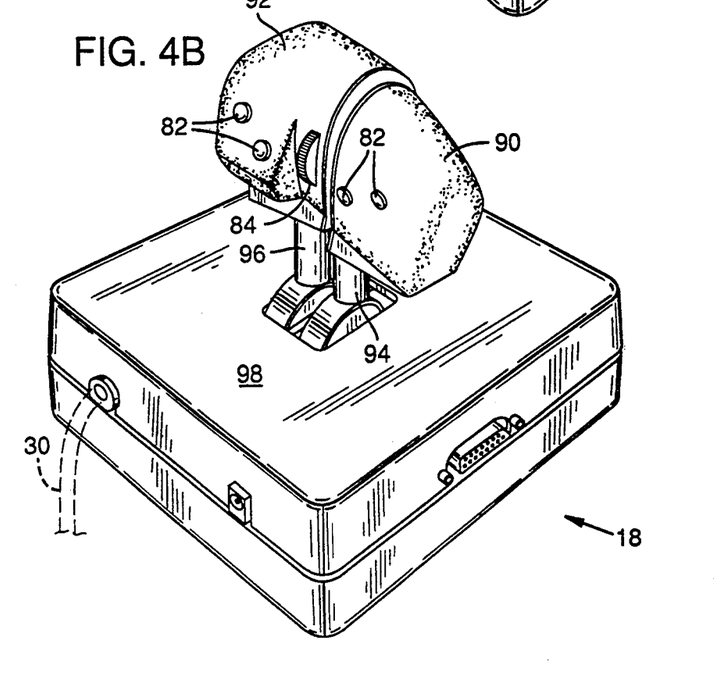
FIG. 4B is a perspective view of the front side of the split throttle controller of FIG. 1.

The split-throttle controller 18 shown in FIGS. 1, 4A and 4B itself has an additional seven discrete switches 82, a three-way switch 86, three potentiometer outputs, and a track ball 88. The three potentiometer outputs, which transduce the positions of two throttle sticks 94 and 96 and the position of a rotary dial 84 mounted on the throttle, consume three analog inputs. The switches alone cannot be supported by only the four discrete inputs of a conventional game port, not to mention the other inputs. The discrete switches are combined with the three-way switch into a single analog input using a resistor ladder network as described in my copending application Ser. No. 07/911,765. By combining the discrete inputs into a single analog input, the split-throttle controller 18 is able to include a track ball 88 operated by the thumb for positioning a cursor on the screen during the video simulation. The track ball output circuitry consumes all four of the discrete inputs to represent the four directions of movement: right, left, up, and down. Track balls providing four discrete outputs for representing the relative movement of the ball are commercially available, such as the F13 Tracking Mechanism by Appoint, Inc. However, it may be necessary to buffer the discrete outputs of the track ball depending on the output drive characteristics of the track ball selected. The joystick 20, the foot-pedal rudder controller 50, and the split-throttle 18 require two separate and complete game ports to support all of the input capability of the controllers, but conventional PCs only support one single-port game card.

Figure 2:
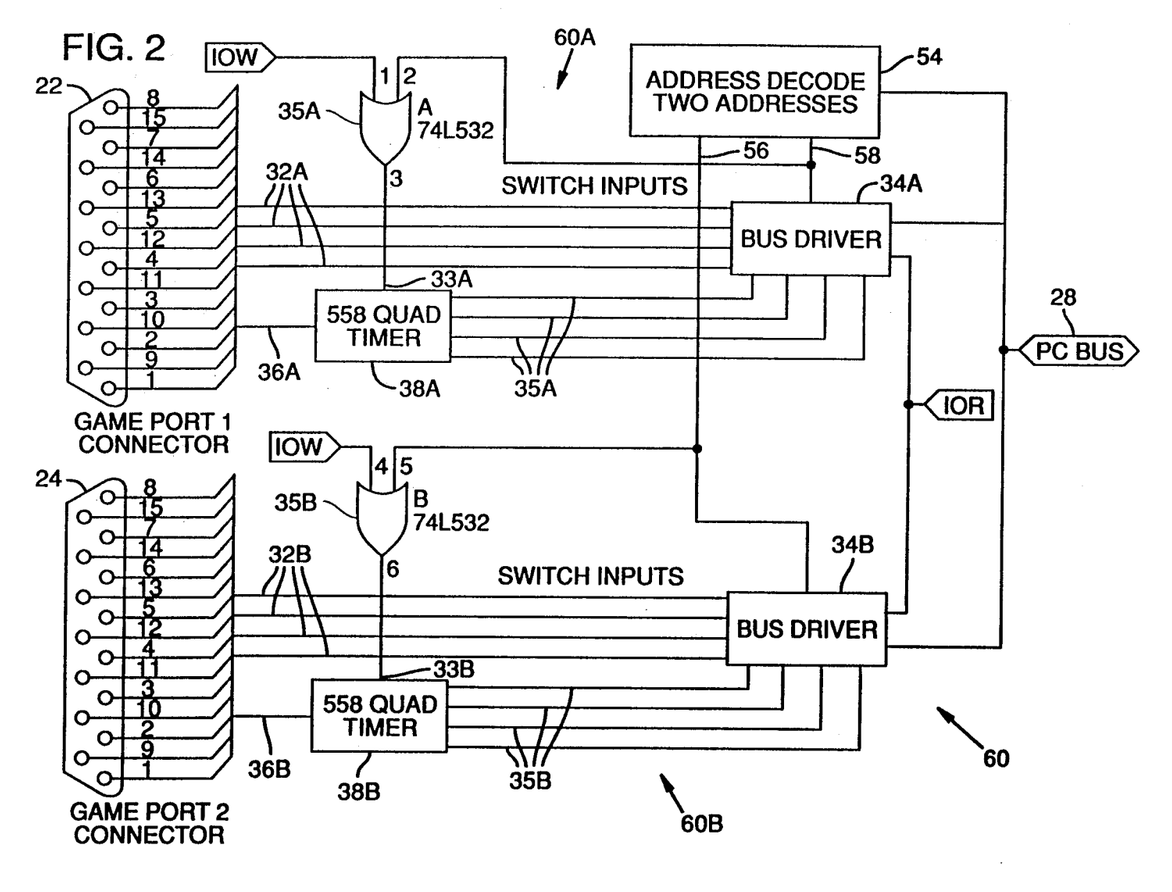
FIG. 2 is a block diagram of a dual port game board circuit in accordance with invention connected to a conventional personal computer input/output bus.

As shown in FIG. 2, two game ports 22 and 24 are selectively connected to a PC input/output bus 28 of a multi-ported game board 60, described in detail below. Not expressly shown in FIG. 2 are the support components such as pull-up/pull-down and/or series resistors and capacitors that would be required in a commercially available product, the use of which are commonly known in the art of digital design. The PC I/O bus 28 is conventionally provided in computer 12 for connecting peripheral input and output devices to the PC microprocessor. The PC bus consists of a data bus, over which data is passed to and from the microprocessor, and a control bus, over which the address and control signals are transmitted to control peripheral devices residing on the bus. Two of the control signals are shown explicitly: the write strobe IOW, which indicates a valid microprocessor write cycle; and the read strobe IOR, which indicates a valid microprocessor read cycle. The use of these two signals in the invention will become apparent through the detailed description of the preferred embodiment that follows.

Conventionally, the game board coupled to the PC bus 28 has a finite number of inputs for receiving and inputting to the microprocessor a limited number of discrete and analog input signals through a single industry standard game port connector, as stated above. This embodiment provides two such connectors 22,24, for coupling at least two multifunctional controllers to game port interface circuits 60A, 60B. Each of the game port interfaces 60A,60B has four binary or discrete switch inputs 32A and 32B and four analog inputs 36A,36B. In order for the analog inputs to be read over the microprocessor data bus, the variable analog inputs are converted to a digital signal having a width proportional to the voltage of the signal by a quad timer 38A,38B. The quad timer samples each of its respective analog input signals responsive to a trigger pulse received on its trigger input 33A,33B. The quad timer includes a one shot circuit that receives variable voltage level signals from the respective game port connector 22 or 24 and outputs constant level signals of a duration proportional to input voltage level.

The microprocessor reads the discrete inputs and the quad timer outputs of one of the game ports 22 or 24 one at a time, according to the inventive principle, and outputs the signals to the PC bus 28 via the corresponding bus driver 34A or 34B. A subroutine within the video game/simulation program, after issuing the trigger command, times the different duration signals and selects a unique control command in the program in accordance with the timed duration. In this way, the personal computer is able to sense the magnitude and direction of the variable input signals to effect a corresponding change in the displayed images produced by the program. The use of the timer to convert continuously variable analog inputs to proportional duration digital signals is known in the art of game board design.

In order to differentiate between the two game ports 22, 24, the game board circuitry includes a strappable address decode circuit 54. The major constituent parts of the circuitry are shown in greater detail in FIG. 3. The address decoder monitors the PC bus for the unique addresses assigned to the game card ports and selectively enables the respective game port when the valid address is received. Conventionally, the game port resides at the 0201H address, as shown in "Interfacing to the IBM Personal Computer", pp. 197-198, by Lewis C. Eggebrecht (1983). However, the remainder of the address locations within the 0200H-0277H contiguous address range are unused, as shown by Eggebrecht (1983), pg. 129. The purpose of the memory map logic 62 is to decode a portion of the unused address space, including 0201H, hereafter known as the game port address space, and issue a valid enable signal 76 when a valid microprocessor bus access to the game port address space is detected. The enable signal 76 drives the enable input of a conventional 3-to-8 decoder 64, e.g., 74LS138. The select inputs 70,70,74 of the decoder are driven by the least significant address bits of the PC control bus, which in turn specify the precise address within the game port address space currently being addressed. The outputs of the decoder then correspond to a unique address within the game port address space.

Figure 3:
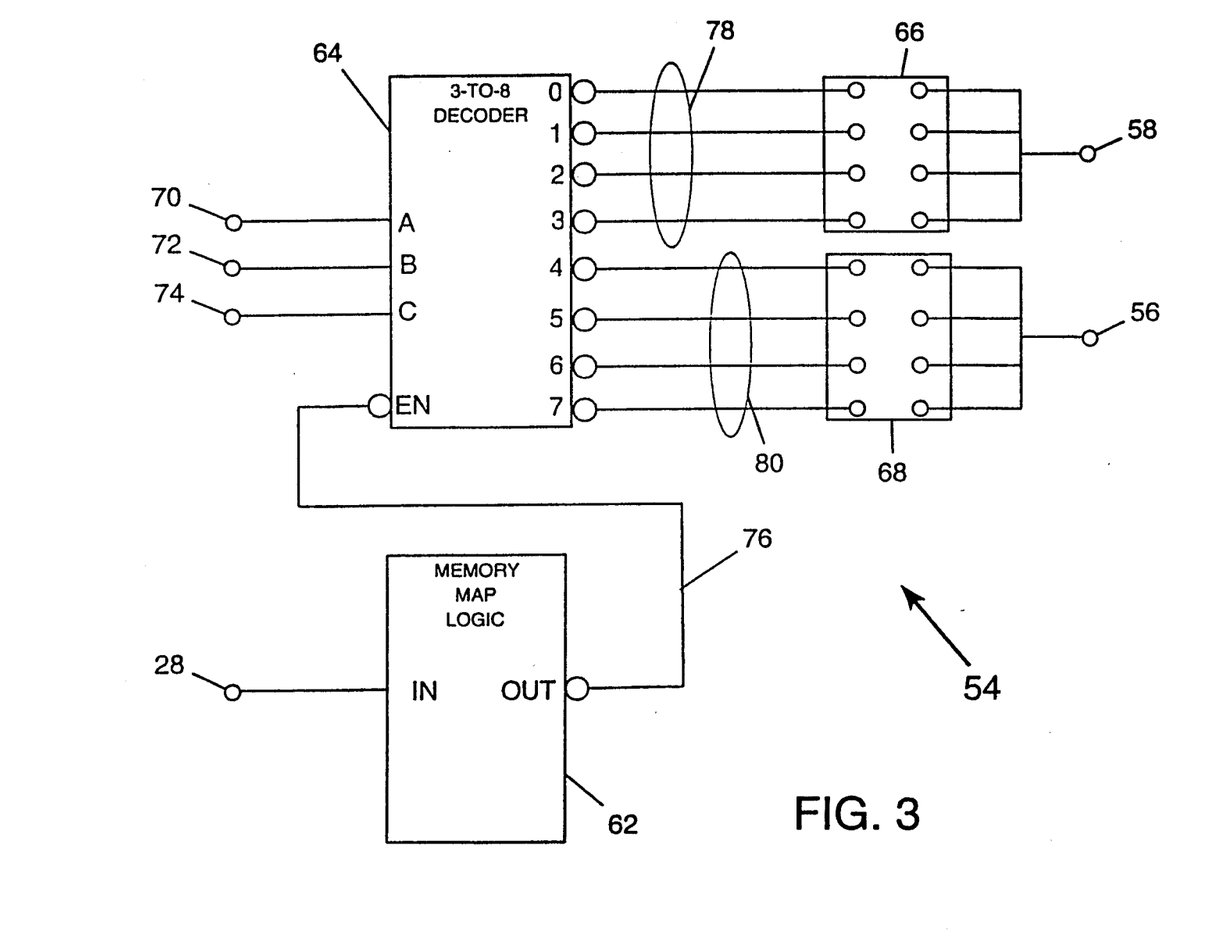
FIG. 3 is a schematic of the address decode circuitry of FIG. 2 used to map the separate game ports to distinct memory ranges.

The outputs of the decoder are grouped into two separate groups of signal lines 78 and 80. The first group of signal lines 78 correspond to the first four outputs of the decoder, and the last group of signal lines 80 to the last four outputs of the decoder. The first group of signal lines 78 are coupled to the inputs of a first jumper block 66. The jumper block consists of four individual input posts and four corresponding output posts. The input posts are connected to the corresponding output posts by mounting a jumper across the two posts. The jumpers are individually removable. The outputs of the first jumper block are coupled together to form the first game port enable signal 58. By mounting a jumper on the jumper block the specific address of the first game port 22 can be selectively mapped to any of the four addresses of the first group of signals. Moreover, more than one jumper can be inserted, resulting in the first game port 22 being mapped to the corresponding multiple addresses. Similarly, the second group of signals 80 are coupled to a second jumper block 68, the outputs of which are tied together to form the second game port enable signal 56. A dual-in-line package (DIP) switch can be substituted for the jumper blocks.

Referring back to FIG. 2, the output signals 56,58 produced by the address decoder are combined with the read and write strobes, i.e., IOR and IOW, to either selectively enable the corresponding bus driver 34A, 34B during a read, or selectively trigger the selected quad timer one-shot during a write. For a read, the selected output signal 56, 58 is combined with the read strobe IOR through an OR gate 35A, 35B, which acts as a negative AND gate with active low inputs and outputs. For a write, the selected output signal is combined with the write strobe IOW by the bus driver 34A, 34B by providing separate enable inputs for the write strobe IOW and the selected output signal 56,58. The combination of these signals is known in the art of digital logic and may take on different forms depending on the logic available to the designer, e.g., programmable logic devices.

Figure 5:
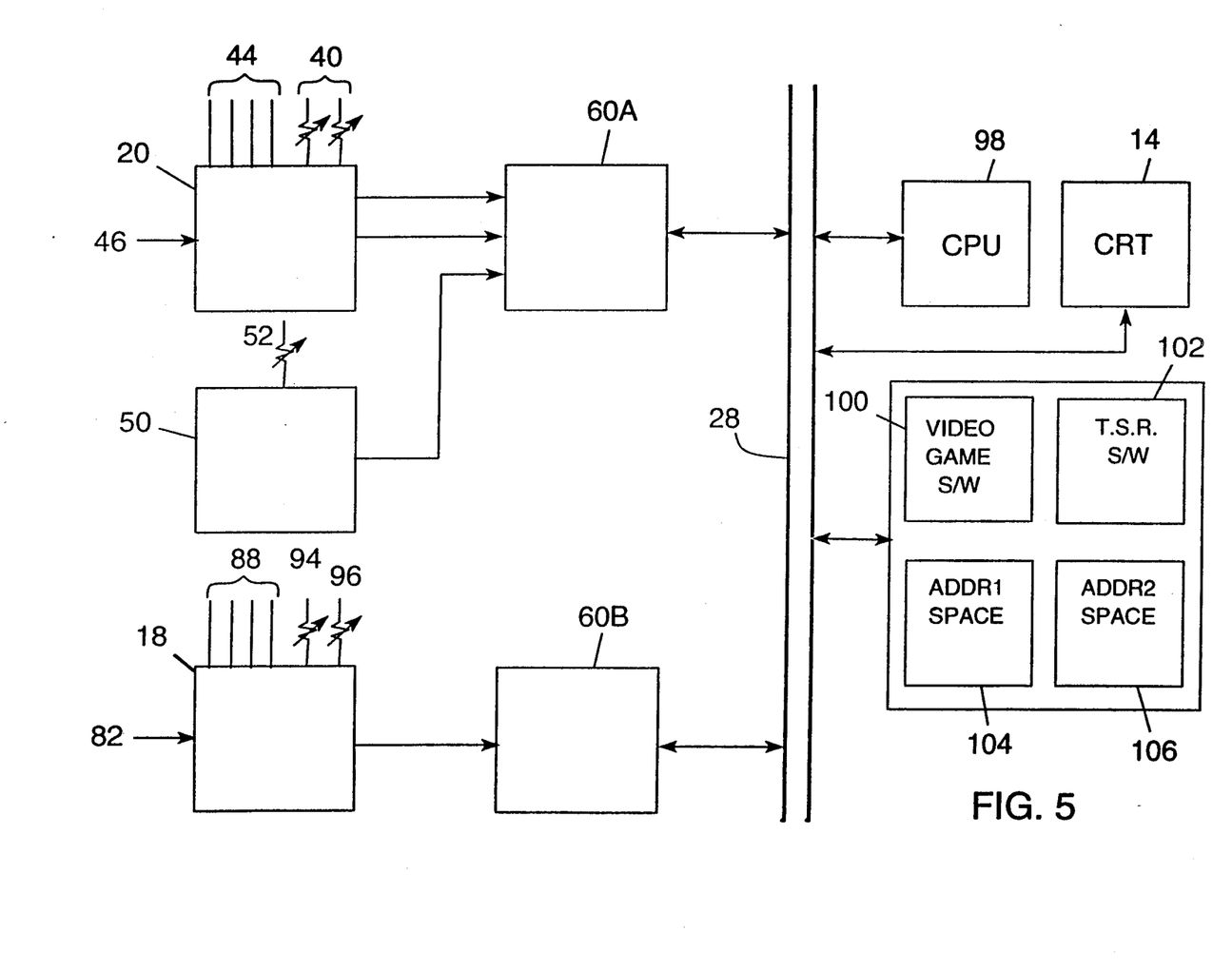
FIG. 5 is a functional block diagram of the system of FIG. 1 incorporating at least two multifunctional controllers using the dual port game board of FIG. 2 and programming to utilize all outputs from the controllers in a video game program.

Referring to FIG. 5, a functional block diagram of the system of FIG. 1 is shown incorporating at least two multifunctional controllers 18,20 using the dual port game board of FIG. 2 and programming to utilize all outputs from the controllers in a video game program. The outputs of the joystick controller 20 and the foot-pedal rudder controller 50 are selectively output through the first game port interface 60A onto the PC I/O bus 28 responsive to the control signals of microprocessor 98 operable under the control of either the video game software (S/W) 100 or a so-called terminate-and-stay-resident (T.S.R.) S/W 102 program, as described in detail below. Similarly, the outputs of the split throttle controller 18 are selectively output through the second game port interface 60B onto the PC I/O bus 28. The microprocessor receives the data over the PC I/O bus 28 and places the data in either the first address space 104 corresponding to the video game software 100, or the second address space 106 corresponding to T.S.R. S/W 102. The video game S/W 100 then receives the data input and updates the cathode-ray-tube (CRT) display 14 according to the data input stimulus.

Figure 6:
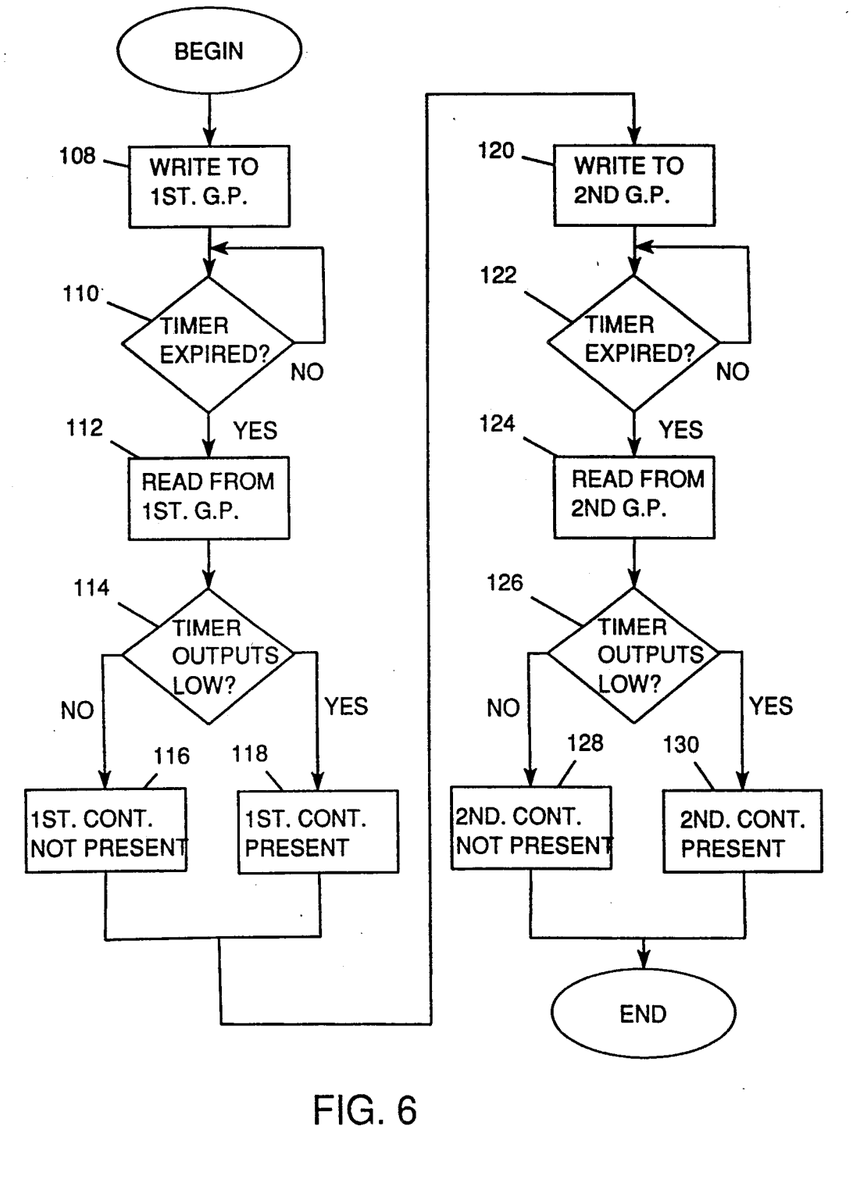
FIG. 6 is a flow chart of a subroutine for detecting multiple controllers in the system of FIG. 5.

Within the computer, an input sub-routine, which can be either the T.S.R. program 102 or an integral part of the video simulation program 100, as mentioned above, will selectively poll the assigned addresses to receive the input data received from each of the controllers, after detecting the presence of one or more controllers. Referring to FIG. 6, the program detects the presence of the controllers by executing the following initialization sequence for each of the controllers: writing to the individual timer port 108; waiting a period of time greater than that possibly produced by a valid voltage level on the analog inputs 110; and reading the corresponding digital output to determine whether a transition occurred on the individual analog inputs 144; and setting a flag to indicate the presence of the controller 118, or the lack thereof 116, dependent on the whether the level of the timer output is low or high 114, respectively. The same sequence is followed to determine the presence of the second controller, as shown in steps 120-130 of FIG. 6.

Once the controller's presence is determined, the input subroutine continuously polls the individual controller addresses in a predetermined manner, e.g., round-robin to monitor for new input. In the case of the T.S.R. 102, the subroutine will act as a keyboard emulation program by receiving input signals from each of the separate controllers and placing the corresponding keyboard sequence in the keyboard input buffer, i.e., the second address space 106, for receipt by the simulation program. Alternatively, the input subroutine is integrated into the simulation program. The subroutine then polls each of controllers individually to receive input signals therefrom and place it directly in the video game S/W 100 address space, i.e., the first address space 104, and take the corresponding action dictated by the input without translating the input into a keyboard sequence.

For example, in a combat aviation video game the joystick controller 20 is used to control the direction of the combat aircraft. The movement of the joystick handle changes the two potentiometer settings 40 corresponding to the left/right and up/down movement. Periodically, the video game software 100 or the T.S.R. 102 will poll the corresponding game port to check for new input stimulus received over the game ports. In the case of input data received from the joystick, the software will begin timing the pulse width of the timer outputs corresponding to the joystick potentiometer to determine the exact position of the joystick, either left or right, or up or down, or a combination of both. Once the timer pulses have elapsed, the video game software 100 updates the CRT 14 to reflect the new viewing angle dictated by the joystick handle position.

Similarly, input signals from the split-throttle controller 18 are translated into commands for other aspects of the aviation program. Although the aviation program allows for the input signals to be programmed to a variety of control functions, one possible configuration for the split-throttle 18 is as follows. The two individual throttle members 90,92 provide two separate analog input commands to control the left and right engines of a multiengine combat aircraft. The track ball 88 uses the four discrete inputs to move a cursor on a radar screen displayed on the CRT 14 to select individual targets. The plurality of individual discrete switches 82 mounted on the throttle members, in conjunction with the three-way switch 86, input control signals through the third analog input for a variety of control functions used to simulate air-to-air combat such as target select, target lock and unlock, etc. In addition, the rotary dial 84 uses the fourth analog input to control the antenna elevation. In this way, by operating the joystick and the split-throttle simultaneously, as well as the foot-pedal rudder controller, the operator feels as if he is operating a true combat aircraft in a real time combat situation.

Having described and illustrated the principles of the invention in a preferred embodiment thereof, it should be apparent that the invention can be modified in arrangement and detail without departing from such principles. For example, is should be apparent that the number of game ports can be increased by assigning smaller address ranges to each of the game ports. The number of game ports being limited by the physical space of the connectors and/or the number of unique addresses available. I claim all such modifications and variation coming within the spirit and scope of the following claims.

I claim:

1. A multi-port game card for interfacing game input devices to a personal computer including a microprocessor having a data and control bus comprising:
    a printed circuit board for mounting electrical components and connectors thereupon having an area defined by the space within the computer which is capable of receiving a game card;
    a bus connector for connecting the printed circuit board into a computer backplane adapter to provide electrical communication to the computer's data and control bus;
    a first game port mounted on the printed circuit board including: a first game port connector for receiving a plurality of digital and analog signals from a first game input device, first interface circuitry including a first timer for converting the analog signals into a digital signal with a pulse width proportional to the analog voltage having a first timer write input signal, and a first bus driver having an enable input operatively coupled to transmit digital signals from the first game port connector and the first timer to the bus connector;
    a second game port mounted on the printed circuit board including: a second game port connector for receiving a plurality of digital and analog signals from the second game input device, second interface circuitry including a second timer for converting the analog signals into a digital signal with a pulse width proportional to the analog voltage having a second timer write input signal, and a second bus driver having an enable input operatively coupled to transmit digital signals from the second game port connector and the second timer to the bus connector;
    an address decoder coupled to the bus connector to receive a polling signal including a multi-value digital address signal for decoding the address signal; and
    means responsive to the address decoder for selectively enabling a selected one the first and the second game ports dependent on the decoded address signal to transmit the respective digital signals to the bus connector.

2. A multi-port game card according to claim 1 in which the address decoder includes means for combining a plurality of outputs to form a fewer number of said outputs.

3. A multi-port game card according to claim 2 in which the address decoder includes:
    a first jumper block having a plurality of inputs and a plurality of outputs, each of the inputs is coupled to an output of the address decoder, the outputs of the jumper block are coupled together to form a first common output node; and
    a second jumper block having a plurality of inputs and a plurality of outputs, each of the inputs is coupled to an output of the address decoder, the outputs of the jumper block are coupled together to form a second common output node.

4. A multi-port game card according to claim 1 wherein the means responsive to the address decoder comprises:
    a first logic gate having a first input coupled to the first common output node and a second input for receiving a signal from the computer's control bus which indicates a valid write cycle, and having an output which is operatively coupled to the first timer write input;

a second logic gate having a first input coupled to the first common output node and a second input for receiving a signal from the computer's control bus which indicates a valid read cycle, and having an output which is operatively coupled to the first bus driver enable input;

a third logic gate having a first input coupled to the second common output node and a second input for receiving a signal from the computer's control bus which indicates a valid write cycle, and having an output which is operatively coupled to the second timer write input; and a fourth logic gate having a first input coupled to the second common output node and a second input for receiving a signal from the computer's control bus which indicates a valid read cycle, and having an output which is operatively coupled to the second bus driver enable input.

5. A video game/simulation system for stimulating operation of a complex system having a plurality of user-controlled functions, the system comprising:

a personal computer having a microprocessor operable under control of a video game/simulation program, a display for displaying images produced by the program, and an input/output bus for connecting peripheral input and output devices to the microprocessor by producing a peripheral address and exchanging data therefrom;

a game board coupled to the input/output bus having a first input connector and first interface circuit for receiving and inputting a first finite number of inputs to the microprocessor and having a second input connector and second interface circuit for receiving and inputting a second finite number of inputs to the microprocessor;

a first video game/simulator controller having a first plurality of signal lines not exceeding said first finite number, the first signal lines coupled to the first input connector and interface circuit;

a second video game/simulator controller having a second plurality of signal lines not exceeding said second finite number, the second signal lines coupled to the second input connector and interface circuit;

means in the personal computer for sequentially polling said first and second video game/simulator interface circuit to receive input signals from the respective controller signal lines coupled thereto; and means for inputting said input signals as control data to the video game/simulation program to effect a corresponding change in the displayed images produced by the program.

6. A video game/simulation system according to claim 5 including means for allocating the control data from each controller to a unique address location in correspondence to the selection of each controller by the sequential polling means.

7. A video game/simulation system according to claim 5 wherein said first video game/simulator controller comprises:

a split-throttle controller having first and second separately controllable throttle members for providing individual throttle settings to the video game/simulator program, said throttle having seven discrete switches for representing distinct inputs to the video game/simulator program, a three-way switch for controlling the input representation of said discrete switches, a rotary dial continuously variable for providing an additional input to the program, and a track ball suspendedly mounted on the throttle so as to be rotatable by the user's thumb while grasping the throttle in the natural manner dictated by the contour of the throttle, said track-ball providing position information to the program for positioning a cursor on the display responsive to the track-ball movement.

8. A video game/simulation system according to claim 5 wherein the sequentially polling means includes:

a decoder having an input and a plurality of outputs, the input of said decoder operatively coupled to the input/output bus for receiving the peripheral addresses, each of the plurality of outputs responsive to a unique peripheral address received on the input;

means for combining the outputs of said decoder wherein the combining means combines a number of individual outputs of said decoder to produce a fewer number of outputs of said combining means; and means for generating peripheral addresses on the input/output bus in a predetermined manner.

9. A method of interfacing two multifunctional game controllers simultaneously to a personal computer to simulate operation of a complex system having a plurality of user-controlled functions, the personal computer having a microprocessor operable under control of a video game/simulation program, a display for displaying images produced by the program, an input/output bus for connecting peripheral input and output devices to the microprocessor, a single game card adapter for coupling a game card and connected peripheral input device to the input/output bus, and means in the personal computer for interpreting each signal line received from said peripheral input device as a separate discrete command and inputting said command to the video game/simulation program to effect a corresponding change in the displayed images produced by the program, the method comprising:

coupling to the input/output bus a game board having a first input connector and interface circuit for receiving and inputting a first finite number of inputs to the microprocessor, and a second input connector and interface circuit for receiving and inputting a second finite number of inputs to the microprocessor;

providing a first video game/simulator controller having a first plurality of signal lines not exceeding said first finite number, and coupling the first signal lines to the first input connector;

providing a second video game/simulator controller having a second number of signals lines not exceeding said second finite number, and coupling the second signal lines to the second input connector;

generating a read request from the microprocessor including one of a plurality of addresses and transmitting the read request to the game board via the I/O bus;

decoding the address provided in said read request to select which of said input connector and interface circuits is being addressed;

transmitting signals from the decoded game/simulator controller coupled to the selected input connector and interface circuit to the personal computer;

interpreting said transmitted signals in the personal computer as a discrete command; and inputting said command to the video game/simulation program to effect a corresponding change in the displayed images produced by the program.

10. A method of interfacing two multifunctional game controllers simultaneously to a personal computer according to claim 9 further comprising allocating said signals from the selected controller to a unique address location in correspondence to selection of said controller.

11. A method of interfacing two multifunctional game controllers simultaneously to a personal computer according to claim 9 further comprising providing an address code for each of said input connectors and interface circuits encoding a unique address therein.

12. A multifunctional split-throttle controller compatible with a standard game port having inputs consisting of a first finite number of discrete inputs and a second finite number of analog inputs, for inputting discrete and analog command signals into a personal computer (PC), the controller comprising:
- a base for supporting two separately controllable throttle members;
- an electrical signal multiple conductor connector mounted on said base, said connector having a first finite number of discrete outputs and a second finite number of analog outputs;
- a first separately controllable throttle member hingedly mounted on said base and having means for outputting a first continuously variable analog output signal corresponding to the position of said first throttle member with respect to said base to provide a first throttle setting to the PC, said first continuously variable output coupled to a first one of said second finite number of analog outputs;
- a second separately controllable throttle member hingedly mounted on said base and having means for outputting a second continuously variable analog output signal corresponding to the position of said second throttle member with respect to said base to provide a second throttle setting to the PC, said second continuously variable analog output coupled to a second one of said second finite number of analog outputs;
- a plurality of discrete switches greater in number than said first number of finite discrete outputs all coupled to a common input voltage node; and
- circuit means coupling all of the plurality of switches to a third one of said second finite number of analog outputs through a different resistance so as to produce a different discrete level of signal on said third one of said second finite number of analog outputs uniquely corresponding to actuation of each of the switches.

13. A multifunctional split-throttle controller according to claim 12 in which the circuit means is arranged so that each switch is connected in series with a resistor to form a single switching subcircuit and all of the switching subcircuits are connected between the common input voltage node and a single output node coupled to said third one of said second finite number of analog outputs.

14. A multifunctional split-throttle controller according to claim 13 in which each resistor has a different value of resistance.

15. A multifunctional split-throttle controller according to claim 12 in which the circuit means is arranged in a ladder circuit with the switches connected between the common input node and a series of output nodes coupled in series by separate resistors to a single output node coupled to said third one of said second finite number of analog outputs.

16. A multifunctional split-throttle controller according to claim 15 in which each resistor has the same value of resistance.

17. A multifunctional split-throttle controller according to claim 12 further comprising a three-way switch coupled to a common input voltage node for controlling the input representation of said discrete switches.

18. A multifunctional split-throttle controller according to claim 12 further comprising a rotary dial continuously variable coupled to a fourth one of said second finite number of analog outputs.

19. A multifunctional split-throttle controller according to claim 12 further comprising a track ball having a plurality of discrete outputs coupled to said first finite number of discrete outputs for providing position information on the movement of the track-ball to the PC.

* * * * *